(12) United States Patent
Murgan et al.

(10) Patent No.: US 8,712,359 B2
(45) Date of Patent: Apr. 29, 2014

(54) COMMUNICATION DEVICE AND METHOD FOR DETECTING A RADIO SIGNAL

(75) Inventors: Tudor Murgan, Munich (DE); Jean-Xavier Canonici, Cannes (FR); Werner Hein, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/592,400

(22) Filed: Aug. 23, 2012

(65) Prior Publication Data

US 2014/0057624 A1 Feb. 27, 2014

(51) Int. Cl.
*H04B 7/00* (2006.01)
*H04W 4/00* (2009.01)

(52) U.S. Cl.
USPC ............... 455/259; 455/256; 455/434

(58) Field of Classification Search
USPC .......... 455/422.1, 434, 230, 255, 258, 259, 455/260, 265
See application file for complete search history.

(56) References Cited

U.S. PATENT DOCUMENTS

| | | | | |
|---|---|---|---|---|
| 5,204,972 A | * | 4/1993 | Hashimoto | 455/207 |
| 5,970,400 A | * | 10/1999 | Dwyer | 455/254 |
| 6,337,600 B1 | * | 1/2002 | Shigemori et al. | 331/16 |
| 2001/0000959 A1 | * | 5/2001 | Campana, Jr. | 340/573.1 |
| 2003/0199254 A1 | * | 10/2003 | Kusbel | 455/77 |
| 2003/0211837 A1 | * | 11/2003 | Kitatani | 455/192.1 |
| 2004/0152434 A1 | * | 8/2004 | Peterson et al. | 455/196.1 |
| 2006/0035612 A1 | * | 2/2006 | Miyagi et al. | 455/226.1 |
| 2006/0121864 A1 | * | 6/2006 | Rodgers et al. | 455/182.1 |
| 2008/0125141 A1 | * | 5/2008 | Lai | 455/456.1 |
| 2009/0074035 A1 | * | 3/2009 | Sudo et al. | 375/147 |
| 2010/0048157 A1 | * | 2/2010 | Carrera et al. | 455/307 |
| 2011/0159879 A1 | * | 6/2011 | Sugawara et al. | 455/445 |
| 2011/0181366 A1 | * | 7/2011 | Schoepf et al. | 331/18 |

\* cited by examiner

*Primary Examiner* — Christopher M Brandt

(57) ABSTRACT

For example, a communication device may be provided comprising an oscillator configured to generate a reference signal; an accuracy determiner configured to determine information about an accuracy of a frequency of the reference signal; a signal detector configured to detect the presence of a radio signal; and a controller configured to control the signal detector based on the information.

24 Claims, 5 Drawing Sheets

COMMUNICATION DEVICE AND METHOD FOR DETECTING A RADIO SIGNAL

TECHNICAL FIELD

The present disclosure relates to communication devices and methods for detecting a radio signal.

BACKGROUND

A mobile terminal typically needs to search for a radio cell to camp on when it is switched on and may for example also need to search for candidate radio cells for a potential or required handover during operation.

One of the most challenging cell search types is the initial cell search procedure which is carried out in frequency-unlocked mode, i.e. when the mobile terminal is not yet synchronized with the radio cell in terms of the radio frequency used by the radio cell. In this case, the cell searcher of the mobile terminal is responsible not only to find a suitable cell to camp on, but also to perform the initial frequency acquisition. In this stage, the modem of the mobile terminal typically experiences the worst case of frequency offset especially if, for example, there is a long period of inactivity between calibration during production of the mobile terminal and the first time it is switched on, or if the calibration still leaves a significant offset at least in some operating points, or if no calibration is performed Accordingly, cell search procedures which are robust against frequency offsets are desirable.

SUMMARY

For example, a communication device may be provided including an oscillator configured to generate a reference signal; an accuracy determiner configured to determine information about an accuracy of a frequency of the reference signal; a signal detector configured to detect the presence of a radio signal; and a controller configured to control the signal detector based on the information.

As another example a method for detecting a radio signal according to the communication device described above may be provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
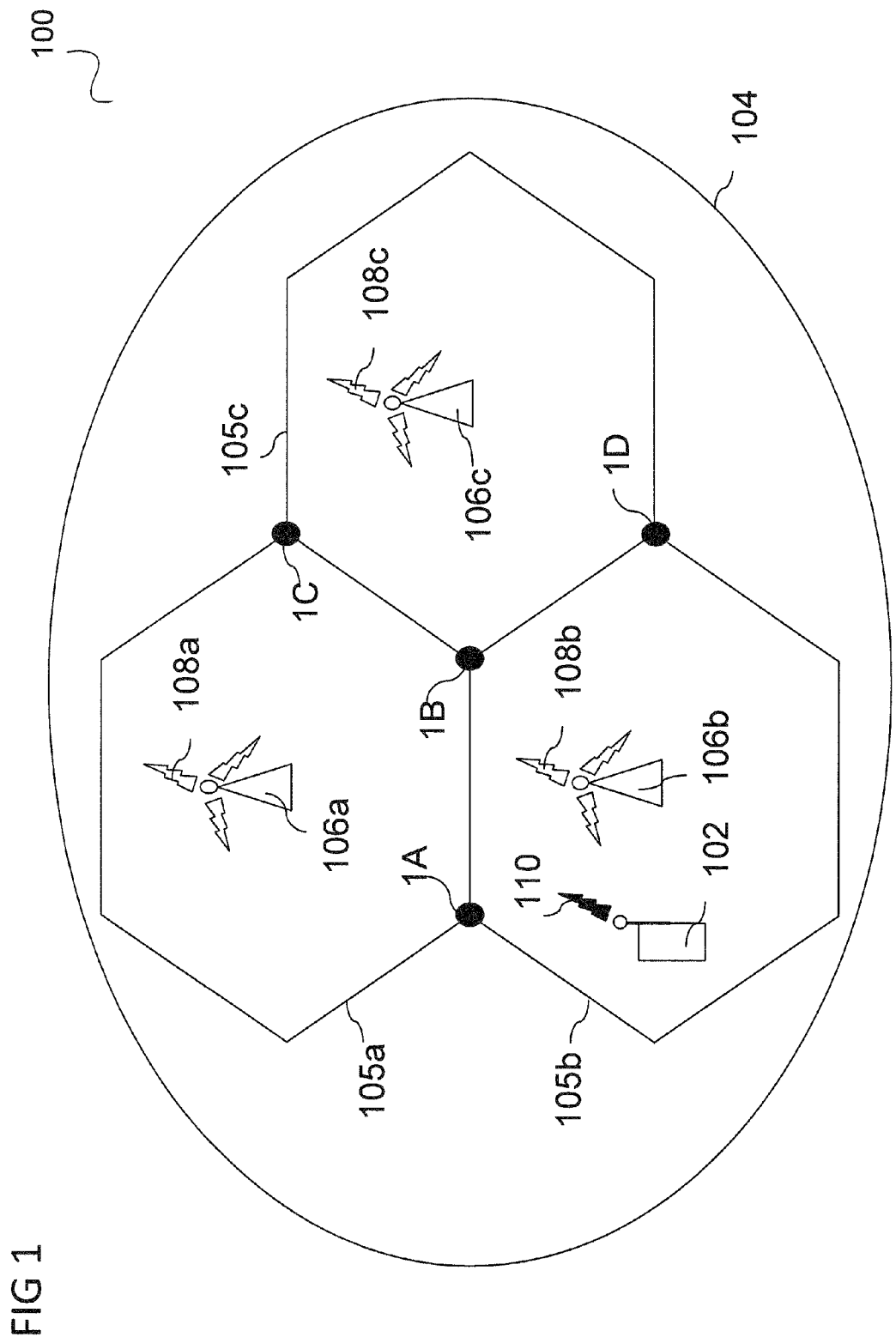
FIG. 1 shows a communications system.

FIG. 1 shows a communications system 100.

The communications system 100 may be configured in accordance with the network architecture of any one of, or any combination of, a LTE (Long Term Evolution) cellular communications system, WLAN (wireless local area network), WiFi, UMTS (Universal Mobile Telecommunications System), GSM (Global System for Mobile Communications), Bluetooth, CDMA2000 (CDMA: Code Division Multiple Access) cellular communications system, etc.

A mobile terminal 102, such as, for example, according to UMTS, a UE (user equipment) equipped with a USIM (Universal Subscriber Identity Module) running on a UICC (Universal Integrated Circuit Card), may be within the area of coverage of a mobile communication network 104, such as, for example, a PLMN (Public Land Mobile Network). The area of coverage of the mobile communication network 104 may be the aggregate result of the coverage of at least one base station belonging to the mobile communication network 104, such as, for example, one, two, three, four, five, six, seven, eight, nine, ten or even more base stations belonging to the mobile communication network 104, such as tens or hundreds of base stations belonging to the mobile communication network 104. By way of an example, the area of coverage of the mobile communication network 104 in FIG. 1 may at least be the aggregate result of the coverage of base stations 106a, 106b, and 106c and others belonging to the mobile communication network 104 (other base stations not shown in FIG. 1).

In FIG. 1, each base station 106a, 106b, and 106c may be configured to transmit a downlink (DL) signal at a particular power to cover a particular geographical area. By way of an example, base station 106a may be configured to transmit DL signals 108a; base station 106b may be configured to transmit DL signals 108b; and base station 106c may be configured to transmit DL signals 108c. The geographical area covered by a particular base station 106a, 106b, or 106c may be substantially (namely, approximately) represented by a cell. By way of an example, the area of coverage of base station 106a may be substantially represented by cell 105a; the area of coverage of base station 106b may be substantially represented by cell 105b; and the area of coverage of base station 106c may be substantially represented by cell 105c. Accordingly, the area of coverage of the mobile communication network 104 may be the result of at least one cell, or the result of a tessellation of a plurality of cells, wherein each cell is an approximation of the area of coverage of a particular base station. By way of an example, area of coverage of the mobile communication network 104 may be the result of the tessellation of cells 105a, 105b, and 105c, wherein each cell is an approximation of the area of coverage of base stations 106a, 106b, and 106c, respectively.

Each cell 105a, 105b, and 105c may be an approximation of the area of coverage of a particular base station 106a, 106b, 106c. Nonetheless, there may be geographical regions that may be served by more than one base station. By way of an example, the geographical region on either side of the boundary formed between points 1A and 1B of FIG. 1 may be served by at least one of base stations 106a and 106b; the geographical region on either side of the boundary formed between points 1B and 1C of may be served by at least one of base stations 106a and 106c; and the geographical region on either side of the boundary formed between points 1B and 1D of may be served by at least one of base stations 106b and 106c.

When the mobile terminal 102 is initially switched off, there is no connection between the mobile terminal 102 and any one of the base stations 106a, 106b, and 106c within the area of coverage of the mobile communication network 104. Accordingly, a mobile terminal 102 that is switched off does not have connectivity to any communications service delivered by the mobile communication network 104. When the mobile terminal 102 is turned on within the area of coverage of the mobile communication network 104, the mobile terminal 102 may be required to search for and identify a base station belonging to the mobile communication network 104 in order to establish an initial communications connection with the mobile communication network 104. By way of an example, mobile terminal 102 may be required to search for and identify any one of, or any combination of 106a, 106b, and 106c in order to be connected to the mobile communication network 104. The mobile terminal may search for and identify one of, or any combination of 106a, 106b, and 106c by receiving and processing the DL signals 108a, 108b, and 108c of the base stations 106a, 106b, and 106c.

Since the area of coverage of each base station may be represented as a cell, searching for and identifying a base station may be considered as searching for and identifying a cell to latch onto. As used herein, latching onto a cell may refer to the mobile terminal 102 starting to camp on a cell which may for example include that the mobile terminal 102 establishes at least one communications channel with the base station serving the cell (e.g. start listening to a broadcast channel and/or a paging channel of the cell). By way of an example, the mobile terminal 102 may latch onto base station 106b in order to establish at least one communications channel in the mobile communication network 104.

A mobile terminal 102 that is initially switched on may search for and identify a cell to latch onto by performing at least one of the following: identifying the frequency (e.g. given by the UARFCN (UMTS Terrestrial Radio Access Absolute Radio Frequency Channel Number)) at which the radio cell is operated (and for this detecting a radio signal, e.g. a synchronization signal of the radio cell), synchronizing slot and frame boundaries between the mobile terminal 102 and the base station serving the cell the mobile terminal 102 is located in; identifying the code group and scrambling code of the base station (and hence, the code group and scrambling code of the cell served by the base station); and acquiring the frequency or frequencies of the base station (and hence, the frequency or frequencies of the cell served by the base station). In this example, the mobile terminal 102 that is initially powered up in FIG. 1 may identify cell 105b served by base station 106b.

When the mobile terminal 102 is switched on, an initial cell search procedure is performed in order to find a (first/initial) suitable radio cell to camp on. Furthermore, on request from the user of the mobile terminal 102 (manual mode) or periodically (automatic mode), the mobile terminal 102 searches for all the PLMNs that are available. For this, the mobile terminal 102 searches on all possible carriers in the available frequency bands to find the strongest cell 105a, 105b, 105c, i.e. the radio cell 105a, 105b, 105c whose DL signals are received with most signal strength.

For example for UMTS, for that purpose, the mobile terminal 102 can schedule for all UARFCNs, i.e. for all frequencies at which cells might be operated, a cell search to be carried out by a cell searcher (i.e. a cell searching component, e.g. a cell searching circuit) of the mobile terminal. The first task carried out by the cell searcher is for example detecting the presence of a radio cell (at a certain frequency, e.g. at a certain UARFCN) by detecting the presence of a synchronization signal of a radio cell (i.e. transmitted by a base station). The cell searcher may for this include the functionality of a signal detector.

The task of the cell searcher may be particularly challenging at extreme temperatures when working with a temperature-wise non-compensated crystals like a DCXO (digitally controlled crystal oscillator) which may typically be used in order to significantly lower the BOM (bill of materials). For example, compared to a VCTCXO (voltage controlled and temperature compensated crystal oscillators) which may have an initial offset of up to 2.5-3 ppm (parts per million), a DCXO may come with an initial offset of 8-10 ppm (or even more) at extreme temperatures (e.g. −20° C. and +85° C.). This means a worst case offset of approximately 20 kHz in UMTS Band I.

When the cell searcher is not provided with a life-time calibration or learning procedure, or when it operates at temperatures outside the range of such procedures, the worst case frequency-offset is typically temperature-dependent.

A mobile terminal may be provided that implements an initial cell search procedure that is aware of the accuracy of its frequency generation (e.g. is temperature-aware) and which is scalable, e.g. in terms of the size of the frequency range it covers in the cell search.

Figure 2:
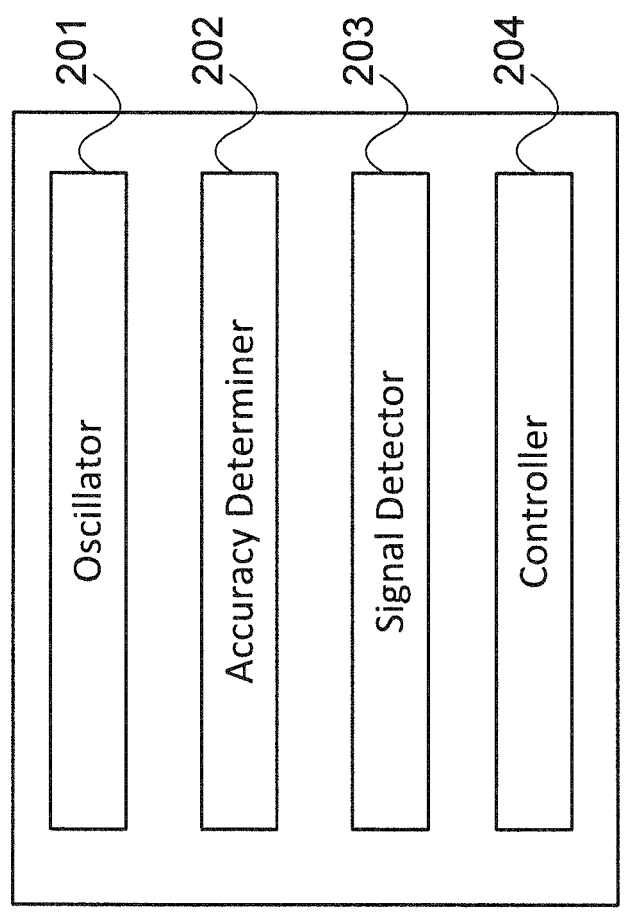
FIG. 2 shows a communication device.

FIG. 2 shows a communication device 200.

The communication device 200 includes an oscillator 201 configured to generate a reference signal and an accuracy determiner 202 configured to determine information about an accuracy of a frequency of the reference signal.

The communication device 200 further includes a signal detector 203 configured to detect the presence of a radio signal and a controller 204 configured to control the signal detector based on the information.

In other words, a communication device (e.g. a mobile terminal) takes the accuracy of the frequency of a reference signal (that is for example used for signal detection by correlation) into account for signal detection (e.g. for a cell search procedure in which a synchronization signal is to be detected).

The accuracy determiner may for example include a temperature sensor measuring a temperature (e.g. an operating temperature of the communication device, e.g. of the oscillator) and may for example derive an accuracy of the frequency of the reference signal based on the temperature. For example, the accuracy determiner may be configured to learn the dependency of the frequency of a signal generated by the oscillator on the temperature during the lifetime of the communication terminal (e.g. referred to as lifetime learning) or may include pre-stored with information about the dependency of the frequency of a signal generated by the oscillator on the temperature. For example, information may be stored in a memory of the accuracy determiner including an expected accuracy for a certain temperature for the specific oscillator used in the communication device. The accuracy determiner may also derive the information about the accuracy from an aging of the oscillator (e.g. from information on how long the oscillator has been used) and/or a operating humidity of the oscillator which may also have impact on the frequency of the generated reference signal.

The accuracy of the determiner is for example the accuracy with which the frequency of the generated reference signal is equal to the frequency to which the oscillator is set, i.e. the frequency for which the oscillator is requested to generate the reference signal, which is for example a frequency at which the radio signal is expected.

The oscillator is for example a crystal or quartz oscillator, e.g. a DXCO (digitally controlled crystal oscillator).

The components of the communication device (e.g. the oscillator, the accuracy determiner, the signal detector, the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The controller is for example configured to control a frequency error tolerance of the signal detector based on the information.

For example, the controller is configured to determine a number of radio frequencies based on the information, to determine a set of radio frequencies having the determined number and to control the signal detector to detect, for each radio frequency of the set of radio frequencies, whether the radio signal is present at the radio frequency. In other words, the signal detection may be carried out for a plurality of frequencies, e.g. in case of a high inaccuracy of the oscillator, i.e. the frequency of the reference signal. For example, if a high inaccuracy of the oscillator is determined, a signal detection is carried out for a plurality of frequencies (i.e. using a plurality of signals with different frequencies generated by the oscillator instead of only the signal with the reference frequency) to increase the likelihood that the signal can be detected, in other words that the correct frequency is "hit" by the signal detection.

For example, the controller is configured to determine the set of reference frequencies to form a symmetrical set of radio frequencies around the frequency of the reference signal.

The controller is for example configured to control the signal detector to perform a radio signal detection procedure (e.g. a cell search) for each radio frequency of the set of radio frequencies with the radio frequency of the reference signal as center frequency of the detection procedure.

For example, the controller is configured to determine the number to be the bigger the lower the accuracy of the frequency of the reference signal is (and vice versa to determine the number to be the smaller the higher the accuracy of the frequency of the reference signal is).

The detection procedure is for example a radio cell search procedure.

The controller may be configured to determine a frequency range based on the information and to control the signal detector to detect whether the radio signal is present within the frequency range.

For example, the controller is configured to control the signal detector to detect whether the radio signal is present within the frequency range by controlling the processing effort of the signal detector to have the signal detector to cover the frequency range in the detection. In other words, the effort that the signal detector spends for the signal detection (e.g. the accuracy of the analysis of received signals, the complexity of the detection algorithm that is used, the detection or correlation sensitivity etc.) may be adapted depending on the determined accuracy. It should be noted that such an adaptation of accuracy may also be combined with the performing of a signal detection and a plurality of frequencies as described above. For example, based on the determined accuracy, the controller may determine a search strategy corresponding to a certain number of signal detection procedures and a certain processing effort per signal detection procedure. In this context, signal detection procedure refers to the signal detection at one specific frequency, e.g. using a signal with a certain frequency for correlation with a received signal.

For example, the controller is configured to determine the size of the frequency range based on the information.

For example, the controller is configured to determine the size to be the bigger the lower the accuracy of the frequency of the reference signal is (and vice versa to determine the size to be the smaller the higher the accuracy of the frequency of the reference signal is).

The controller is for example configured to determine the frequency range to be symmetrical around the frequency of the reference signal.

The controller may be configured to request the oscillator to generate the reference signal to have a predetermined frequency.

The predetermined frequency is for example an expected frequency of the radio signal. In other words, the predetermined frequency is a frequency (referred to as "expected" frequency) at which a radio signal might be sent, i.e. at which it is possible (e.g. in accordance with a radio communication standard) that the radio signal is sent, in other words a candidate frequency for a radio signal. In UMTS, for example, the predetermined frequency is a frequency corresponding to a UARFCN or a frequency that has been pre-selected (e.g. from the frequencies corresponding to all possible UARFCNs) for the signal detection, e.g. for a cell search.

For example, the radio signal is a radio signal transmitted in accordance with a radio communication standard and the predetermined frequency is a frequency of the radio signal according to the radio communication standard.

The radio signal is for example a radio signal transmitted by a base station.

The radio signal is for example a synchronization signal.

For example, the radio signal is a synchronization signal of a radio cell of a cellular radio communication network, e.g. a primary synchronization signal (e.g. according to UMTS or LTE).

The information about the accuracy is for example a measure of the deviation of the frequency of the reference signal generated by the oscillator from an expected frequency of the radio signal (e.g. a maximum frequency offset).

The signal detector is for example configured to detect the presence of the radio signal using the reference signal generated by the oscillator.

The communication device may further include a receiver configured to receive a radio signal and the signal detector may be configured to detect the presence of the radio signal by correlating the received radio signal with the reference signal generated by the oscillator.

The communication device is for example a mobile terminal.

For example, the communication device is a subscriber terminal of a cellular radio communication network.

The communication device may further include a temperature sensor and the accuracy determiner is for example configured to determine the information about the accuracy based on a temperature detected by the temperature sensor.

For example, the information is an accuracy value that is derived from the temperature. Alternatively or in addition to the temperature, the information may also be derived from other parameters specifying an operating condition or a characteristic of the oscillator, e.g. a humidity, an age of the oscillator, a type of the oscillator etc.

Figure 3:
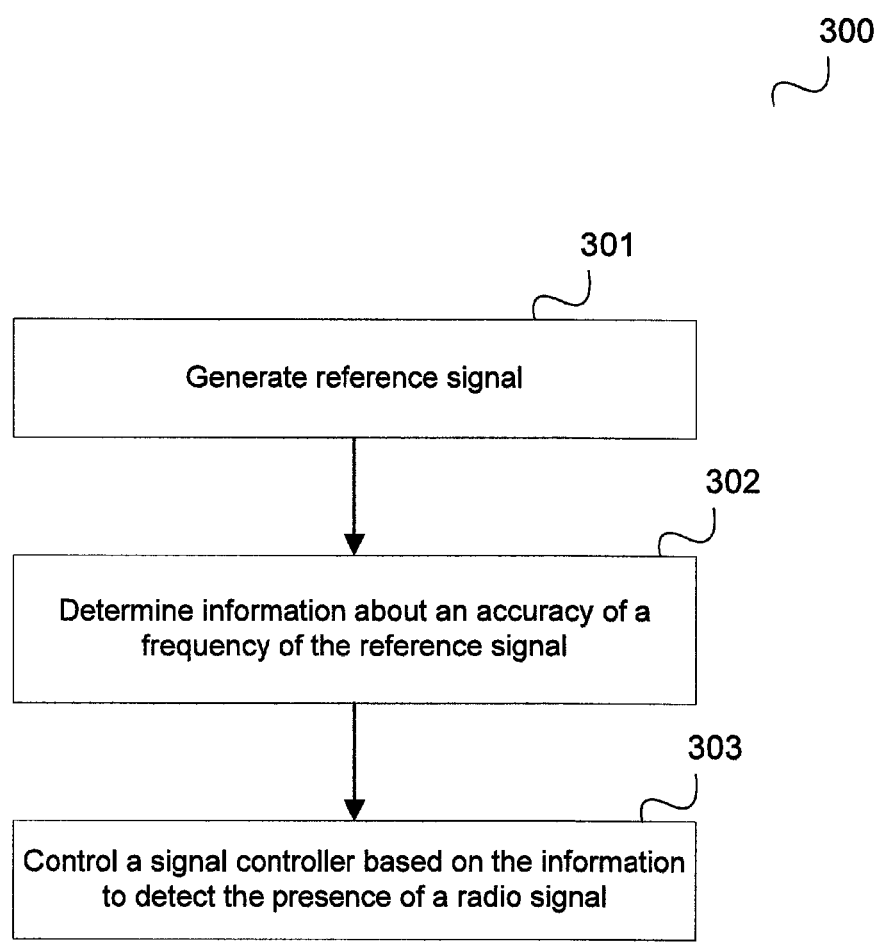
FIG. 3 shows a flow diagram.

The communication device 200 for example carries out a method as illustrated in FIG. 3.

FIG. 3 shows a flow diagram 300.

In 301, the communication device generates a reference signal.

In 302, the communication device determines information about an accuracy of a frequency of the reference signal.

In 303 a signal detector of the communication device detects the presence of a radio signal, wherein a controller of the communication device controls the signal controller based on the information.

It should be noted that aspects described in context of the communication device 200 are analogously valid for the method illustrated in FIG. 3 and vice versa.

In the following, an example for an operation of the mobile terminal 102 (as an example for the communication device 100) in context of a cell search is described in more detail.

Figure 4:
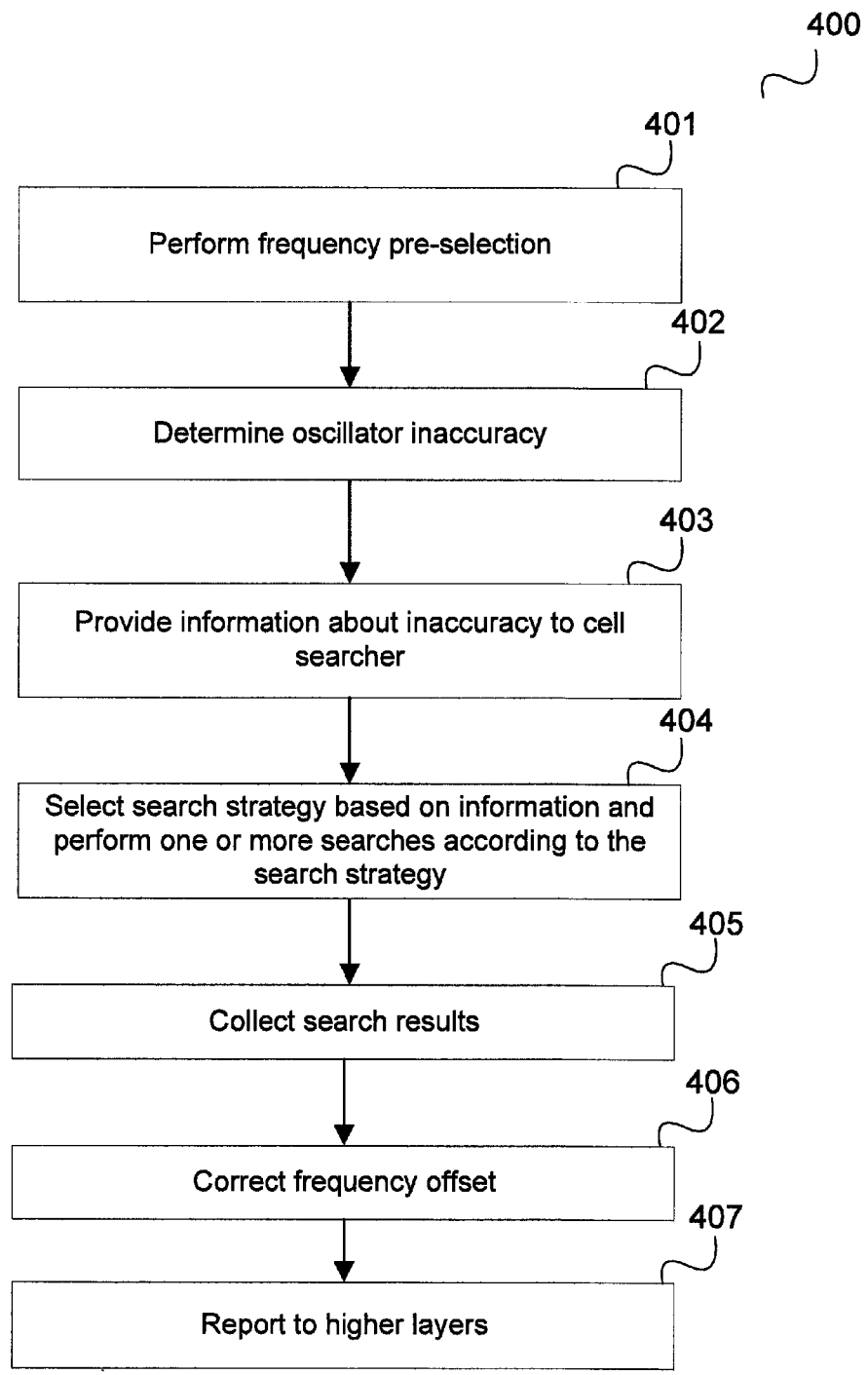
FIG. 4 shows a flow diagram illustrating an example a cell search procedure by a UMTS mobile terminal

FIG. 4 shows a flow diagram 400 illustrating an example a cell search procedure by a UMTS mobile terminal In 401 when the mobile terminal 102 is initially started and it has no knowledge about the mobile communication network 104 at all, it may perform a frequency scan in all supported UMTS bands for pre-selecting (for example RSSI (Received Signal Strength Indication)-based) best candidates (e.g. UARFCNs for which it is most likely that radio cells are operated at the corresponding frequencies). The frequencies (e.g. UARFCNs) found during this pre-selection are selected as frequencies at which an initial cell search procedure is to be performed. The frequencies may also be at least partly pre-defined.

In 402, before an initial cell search is carried out at each of the frequencies found in the pre-selection, the mobile terminal 102 (e.g. a temperature sensor of the mobile terminal 102) measures its operating temperature and, in this example, a simple temperature compensation is done assuming, for example, that no lifetime learning algorithm (for learning the behavior of the mobile terminals' oscillator) is in place or the operating temperature is outside the learned range of such an algorithm. Consequently, a high inaccuracy of the temperature compensation and thus of the frequency of signals generated by the oscillator is expected, e.g. by a component determine the accuracy of the temperature compensation and/or of the frequency of signals generated by the oscillator. For example, at very low or very high temperature (but not necessarily extreme ones) this inaccuracy can be higher than 6 kHz (~3 ppm in Band I—Band I represents also the worst case for the searcher) which would not be tolerable for certain searcher parameterizations and/or algorithms—for instance those employed in VCTCXO platform which have a maximum initial offset of approximately 3 ppm.

In 403, to take the (in this example) high inaccuracy of the frequency of signals generated by the oscillator into account, the accuracy determine provides information about the (low) quality of the temperature compensation and with it the expected maximal frequency error (also referred to as maximum frequency offset) provided to the cell searcher of the mobile terminal 102.

In 404, based on the provided information for maximum frequency offset, the cell searcher selects the search strategy and carries out one or more cell searches for each of the pre-selected frequencies accordingly. For example, based on the temperature-based maximum frequency offset information, the cell searcher selects to split the expected maximum frequency offset range in several sub-intervals that can be covered by a chosen cell searcher algorithm and parameterization and re-use it by calibrating the (crystal) oscillator of the mobile terminal 102 with pre-defined frequency offsets. This is illustrated in FIG. 5.

Figure 5:
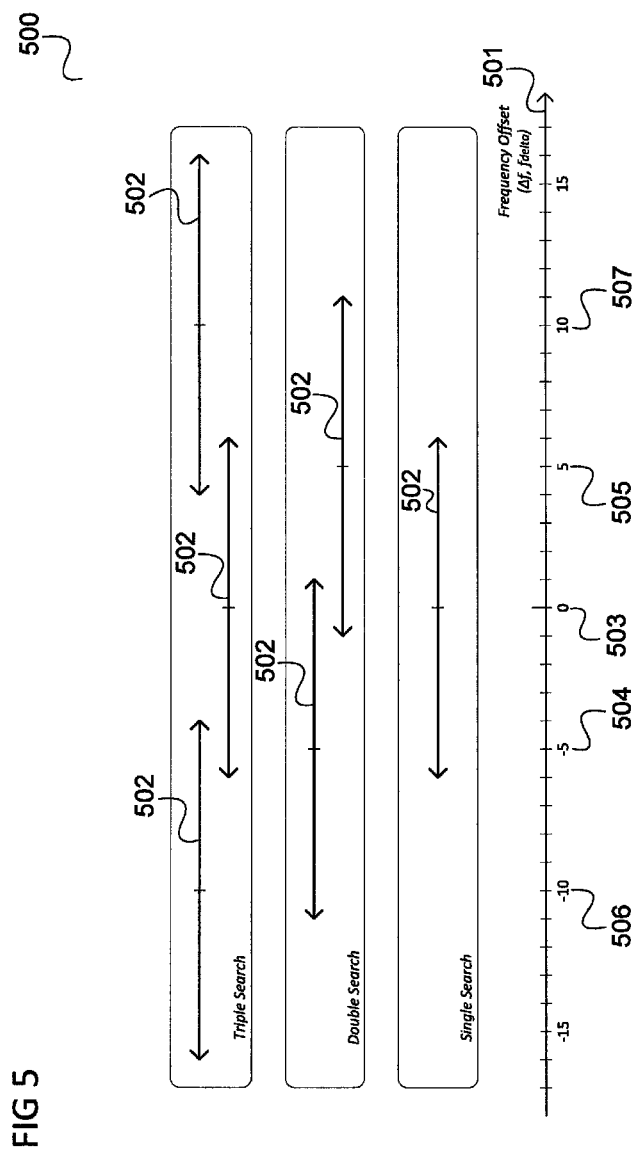
FIG. 5 shows a frequency diagram 500.

FIG. 5 shows a frequency diagram 500.

In FIG. 5, frequency increases along a frequency axis 501.

In this example, it is assumed that the algorithm used by the cell searcher can tolerate a frequency offset as indicated by the length of the arrows 502. This means that if the oscillator generates a signal at a certain frequency (corresponding to the center of one of the arrows 502) the cell searcher is able to find a radio cell even if the frequency at which the radio cell is operated is not the same as the frequency of the signal generated by the oscillator (because the oscillator has an offset) if the "true" frequency, i.e. the frequency at which the radio cell is operated, falls within the frequency range covered by the arrow 502 (i.e. corresponds to one of the points covered by the arrow 502) centered at the frequency of the signal generated by the oscillator. For example, if the oscillator generates a signal with a first frequency 503, the cell searcher is assumed to be able to find the radio cell even if the radio cell is operated at a frequency within −6 kHz and 6 kHz of the first frequency 503, i.e. even if the oscillator misses the correct frequency by −6 kHz to 6 kHz.

Accordingly, the cell searcher uses a single search at the first frequency if the estimated inaccuracy of the oscillator is smaller than 6 kHz.

If the expected maximum frequency offset is greater than 6 kHz but smaller than 11 kHz, the cell searcher performs a double (cell) search. In this case, the cell searcher performs one cell search at a second frequency 504 which is the first frequency 503 minus 5 kHz and one cell search at a third frequency 505 which is the first frequency plus 5 kHz, such that there are two detection intervals. This means that for both offsets −5 kHz and 5 kHz, i.e. at both the second frequency 504 and the third frequency 505 an initial cell search is carried out, i.e. the oscillator is made to generate a signal at the second frequency 504 and a cell search is carried out using the signal generated by the oscillator at this setting and then the oscillator is made to generate a signal at the third frequency 505 and a cell search is carried out using the signal generated by the oscillator at this setting.

If the inaccuracy is even greater than 11 kHz, the cell searcher uses a triple search. In the triple search, the cell searcher performs one search at the first frequency 503, one search at a fourth frequency which is the first frequency 303 minus 10 kHz and a fifth frequency which is the first frequency 303 plus 10 kHz such that there are three detection intervals.

In summary, the cell searcher changes the (set) crystal oscillator frequency, so that a range of 12 kHz, 22 kHz or 32 kHz is covered.

It should be noted that the frequencies given above are only examples and may be chosen differently. For example, the numbers may be chosen such that when more than one detection interval is used in a search (such as two detection intervals in the double search and three detection intervals in the triple search) there are regions of overlap between neighboring detection intervals (such as the overlap of 2 kHz from −1 kHz to +1 kHz between the two detection intervals used in the double search in the above example). This ensures that the detection rate in this overlapping region is not deteriorated compared to the usage of a single detection interval.

Further, the detection intervals (or their positions in the spectrum) is chosen such that they cover a frequency region corresponding to the maximum frequency offset, i.e. cover a frequency region in which the correct frequency is located even if the frequency offset is maximum.

The above approach is scalable and the cell searcher can extend it to even larger frequency offsets (i.e. by performing cell searches at four frequencies around the first frequency 503, or at five frequencies around the first frequency 503 and so on depending on the expected maximum frequency offset).

It should be noted that the absolute value of all of the frequencies 503 to 507 is unknown because the frequency offset of the oscillator is not known. However, the oscillator can be set to generate signals at relative frequencies (in this example at +/−5 kHz and +/−10 kHz, respectively) of the frequency of the signal it generates when set to generate a signal at the frequency at which a radio cell is operated (e.g. a frequency corresponding to a UARFCN). Thus, even if the first frequency 503 differs from the frequency at which a radio cell is operated by up to +/−6 kHz/11 kHz/16 kHz, the cell searcher will still find the cell by using a single/double/triple search.

In 405, the cell searcher collects the results (e.g. reports) of all of the one or more cell searches. Since the timing synchronization stages of an initial search can be successful even at very high offsets if the radio cell is very strong, it is possible that more than one search (searcher shots or lateral searches) is successful.

In 406, the SSY (slot synchronization) and possibly also the FSY (frame synchronization) are used by the cell searcher for a first offset correction and recalibration. Afterwards, the cell searcher can estimate the residual frequency offset using the SCID (Scrambling Code Identification). However, since the frequency offset correction may limited (and it may be indicated to be limited because of possible high variance of the frequency offset correction at large frequency offsets), the SCID (which is for example the last stage of the radio cell search) may not work in a reliable way. Therefore, at the very end (that means after the one or more cell searches for the pre-selected frequency for which a cell search is currently carried out), the cell searcher checks which of the searches has delivered the highest SCID power and/or verifies it to the SSY power and/or FSY power, for example checks whether the SCID power is consistent with the SSY power and/or FSY power. Thus, the cell searcher may select the most reliable SCID in terms of assumed frequency offset correction after the initial phase of the cell search and consequently the most reliable frequency offset estimate.

In 407, the cell searcher reports its findings (i.e. the result of the cell search) to the higher layers of mobile terminal 102 (e.g. higher layer processing elements) and the mobile terminal 102 sets the oscillator accordingly if the cell searcher has been successful in finding a radio cell and estimating the frequency offset. Further, for example, the demodulation of the PCCPCH (Primary Common Control Physical Channel) and the registration procedure can be performed. In case that no radio cell has been found, the cell searcher may make sure that the initial oscillator setting is reestablished.

It should be noted that instead or in combination with increasing the number of cell searches carried out for one pre-selected frequency, i.e. one expected (or in other words candidate) frequency at which a radio cell is operated, the tolerance of each cell search can be increased. Illustratively, in FIG. 5, the length of arrows 502 can be increased to cover a bigger frequency range (i.e. to allow detecting a radio cell for a bigger frequency offset). Thus, for example, the tolerance of the cell searches can be increased, e.g. by using a more thorough search algorithm, using a longer search time and/or spending more computational resources on the search for a higher maximum frequency offset and, if the maximum frequency offset is above a certain threshold, increase the number of searches carried out (e.g. switch from single search to double search) and, for example, in turn somewhat reduce the tolerance of the cell searches to be able to carry out the individual cell searches faster.

It should be noted that when trying to cope with an increasing frequency offset one bad effect on the cell searcher is related to the so-called correlation loss. This translates to the fact that increasing the covered frequency offset range of the cell search algorithm via parameterization (i.e. increasing the tolerance of each individual cell search as mentioned above) may translate in a superlinear increase in search time required for the cell search. On the other hand, when the learning phase for learning the frequency offset (e.g. during a cell search carried out for one pre-selected frequency) is accurate enough, only one cell search and no further calibrations may be required, allowing thus to reduce the complexity of the cell search algorithm and the amount of extra code memory.

In summary, the following is for example carried out:
1. Use the additional information provided by a temperature measuring system and a (lifetime) learning algorithm about the quality of the temperature compensation and the expected maximal frequency error expected at the operating temperature;
2. Select based on the offset range covered by the selected searcher algorithm and configuration the number of necessary searches and crystal oscillators calibrations;
3. Run all the necessary searches, collect the results. If at least one search is successful, select the most reliable one (in terms of estimated frequency offset and detected scrambling code). Otherwise, reestablish the initial crystal oscillator setting.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication device comprising:
   an oscillator configured to generate a reference signal;
   an accuracy determiner configured to determine information about an accuracy of a frequency of the reference signal;
   a signal detector configured to detect the presence of a radio signal;
   a controller configured to control the signal detector based on the information,
   wherein the controller is configured to determine a number of radio frequencies based on the information, to determine a set of radio frequencies having the determined number and to control the signal detector to detect, for each radio frequency of the set of radio frequencies, whether the radio signal is present at the radio frequency.

2. The communication device of claim 1, wherein the controller is configured to control a frequency error tolerance of the signal detector based on the information.

3. The communication device of claim 1, wherein the controller is configured to determine the set of reference frequencies to form a symmetrical set of radio frequencies around the frequency of the reference signal.

4. The communication device of claim 1, wherein the controller is configured to control the signal detector to perform a radio signal detection procedure for each radio frequency of the set of radio frequencies with the radio frequency of the reference signal as center frequency of the detection procedure.

5. The communication device of claim 1 wherein the controller is configured to determine the number to be the bigger the lower the accuracy of the frequency of the reference signal is.

6. The communication device of claim 5, wherein the detection procedure is a radio cell search procedure.

7. The communication device of claim 1, wherein the controller is configured determine a frequency range based on the information and to control the signal detector to detect whether the radio signal is present within the frequency range.

8. The communication device of claim 7, wherein the controller is configured to control the signal detector to detect whether the radio signal is present within the frequency range by controlling the processing effort of the signal detector to have the signal detector to cover the frequency range in the detection.

9. The communication device of claim 7, wherein the controller is configured to determine the size of the frequency range based on the information.

10. The communication device of claim 9, wherein the controller is configured to determine the size to be the bigger the lower the accuracy of the frequency of the reference signal is.

11. The communication device of claim 7, wherein the controller is configured to determine the frequency range to be symmetrical around the frequency of the reference signal.

12. The communication device of claim 1, wherein the controller is configured to request the oscillator to generate the reference signal to have a predetermined frequency.

13. The communication device of claim 12, wherein the predetermined frequency is an expected frequency of the radio signal.

14. The communication device of claim 12, wherein the radio signal is a radio signal transmitted in accordance with a radio communication standard and the predetermined frequency is a frequency of the radio signal according to the radio communication standard.

15. The communication device of claim 1, wherein the radio signal is a radio signal transmitted by a base station.

16. The communication device of claim 10, wherein the radio signal is a synchronization signal.

17. The communication device of claim 1, wherein the radio signal is a synchronization signal of a radio cell of a cellular radio communication network.

18. The communication device of claim 1, wherein the information about the accuracy is a measure of the deviation of the frequency of the reference signal generated by the oscillator from an expected frequency of the radio signal.

19. The communication device of claim 1, wherein the signal detector is configured to detect the presence of the radio signal using the reference signal generated by the oscillator.

20. The communication device of claim 19, further comprising a receiver configured to receive a radio signal, wherein the signal detector is configured to detect the presence of the radio signal by correlating the received radio signal with the reference signal generated by the oscillator.

21. The communication device of claim 1, being a mobile terminal.

22. The communication device of claim 1, being a subscriber terminal of a cellular radio communication network.

23. The communication device of claim 1, further comprising a temperature sensor wherein the accuracy determiner is configured to determine the information about the accuracy based on a temperature detected by the temperature sensor.

24. A method for detecting a radio signal comprising:
generating a reference signal;
determining information about an accuracy of a frequency of the reference signal;
a signal detector detecting the presence of a radio signal, wherein a controller controls the signal detector based on the information,
wherein the controller determines a number of radio frequencies based on the information, determines a set of radio frequencies having the determined number and controls the signal detector to detect, for each radio frequency of the set of radio frequencies, whether the radio signal is present at the radio frequency.

* * * * *